United States Patent [19]

Montague et al.

[11] Patent Number: 5,047,087

[45] Date of Patent: Sep. 10, 1991

[54] CEMENTIFEROUS COMPOSITION AND ADDITIVES FOR USE IN SUCH COMPOSITIONS

[75] Inventors: Peter G. Montague, Dunchurch; Peter Bainbridge, Northants; John T. Hoarty, Golborne, all of United Kingdom

[73] Assignee: National Starch and Chemical Investment Holding Corporation, Wilmington, Del.

[21] Appl. No.: 348,847

[22] Filed: May 4, 1989

Related U.S. Application Data

[63] Continuation of Ser. No. 847,983, Apr. 3, 1986, abandoned.

[51] Int. Cl.$^5$ .............................................. C04B 7/02
[52] U.S. Cl. .................................. 106/810; 106/724; 106/728; 106/802
[58] Field of Search .................................. 106/90, 92

[56] References Cited

U.S. PATENT DOCUMENTS

| | | | |
|---|---|---|---|
| 3,196,122 | 7/1965 | Evans . | |
| 3,806,571 | 4/1974 | Ronnmark et al. | 264/82 |
| 3,850,651 | 11/1974 | Duncan et al. | 106/90 |
| 3,959,237 | 5/1976 | Blank | 526/318 |
| 4,042,407 | 8/1977 | Natsume | 106/90 |
| 4,138,380 | 2/1979 | Barabas et al. | 260/296.6 |
| 4,229,224 | 10/1980 | Dawson et al. | 106/90 |
| 4,384,096 | 5/1983 | Sonnabend | 526/318 |
| 4,460,720 | 7/1984 | Gaidis et al. | 524/5 |
| 4,473,406 | 9/1984 | Bradley et al. | 106/90 |
| 4,524,163 | 6/1985 | Bradley et al. | 524/5 |
| 4,533,709 | 8/1985 | Walinsky | 526/318 |
| 4,888,059 | 12/1989 | Yamaguchi | 106/314 |

FOREIGN PATENT DOCUMENTS

| | | | |
|---|---|---|---|
| B275397 | 10/1969 | Austria . | |
| 0069586 | 12/1983 | European Pat. Off. . | |
| 1189435 | 3/1965 | Fed. Rep. of Germany | 106/90 |
| 2820389 | 11/1978 | Fed. Rep. of Germany | 106/90 |
| 1264052 | 5/1961 | France . | |
| 1561560 | 2/1969 | France . | |
| 2322111 | 3/1977 | France . | |
| 59-162161 | 9/1984 | Japan . | |
| 61-141652 | 6/1986 | Japan . | |
| 61-209943 | 9/1986 | Japan . | |
| 61-209944 | 9/1986 | Japan . | |
| 61-209945 | 9/1986 | Japan . | |
| 497351 | 10/1970 | Switzerland . | |
| 1538103 | 4/1983 | United Kingdom . | |

OTHER PUBLICATIONS

Amts-Mitteilungsbl.-Bundesant. Materialpruef., vol. 9, No. 1, pp. 2-7 1979.

Chemical Abstracts, vol. 91, No. 16, p. 288, Col. 2, Abstract No. 127973d Oct. 15, 1979.

*Primary Examiner*—William R. Dixon, Jr.
*Assistant Examiner*—Chris Gallo
*Attorney, Agent, or Firm*—Ellen T. Dec; Edwin M. Szala

[57] ABSTRACT

The invention provides cost effective cementiferous compositions having superior flow characteristics imparted by the incorporation therein of a copolymer of an ethylenically polymerizable carboxylic acid, an alkyl ester of a ethylenically polymerizable carboxylic acid and, optionally, a third ethylenically unsaturated comonomer.

11 Claims, No Drawings

1

CEMENTIFEROUS COMPOSITION AND ADDITIVES FOR USE IN SUCH COMPOSITIONS

This application is a continuation of application Ser. No. 847,983, filed Apr. 3, 1986 abandoned.

FIELD OF THE INVENTION

This invention relates to cementiferous compositions and to additives for use in such compositions, which additives improve the physical characteristics such as the flow and workability of such compositions.

BACKGROUND TO THE INVENTION

The cementiferous compositions with which this invention is concerned include concretes which comprise cement, coarse and fine aggregates and water; cement pastes which comprise cement and water, and mortars which comprise cement, sand and water; lime, sand and water, or mixtures containing both lime and cement. The invention is also applicable to high-pressure, steam-cured concretes comprising cement, aggregate and water; lime or limestone and siliceous materials such as silica flour and water.

The additives with which this invention is concerned are sometimes referred to as plasticizers and/or superplasticizers for concrete. Their purpose is to improve the flow characteristics of the cementiferous compositions containing them so that they may be pumped or effectively poured to fill all the spaces in a mould or other structure and yet not have their strength characteristics weakened by the inclusion of excessive amounts of air which, in certain circumstances, would be undesirable. In addition, these additives can be used to design cementiferous compositions with a reduced water content. This permits the production of concretes having higher compressive strength when cured and also adequate flow properties for certain applictions.

Various additives for use in cementiferous compositions have been previously proposed, including for example, lignosulphonates and sodium naphthalene sulphonate formaldehyde condensates. Details of such materials are set out in "Chemical Admixtures for Concrete" by M. R. Rixom, published by E. and F. N. Spon Limited, London, and by the Halstead Press, a division of John Wiley and Sons Incorporated of New York, U.S.A., where at page 34, various known additives are considered.

Various polymeric materials have been evaluated as plasticiser additives for cementiferous compositions and it has been found that certain polymers and their soluble salts comprising polymerisable carboxylic acids and the hydroxyalkyl esters of such acids have a definite utility in this application. Such polymers are described in U.S. Pat. No. 4,473,406 (European Patent specification 0097513).

SUMMARY OF THE INVENTION

The applicants have now discovered that comparable results can be obtained using more cost effective copolymers which do not contain hydroxy esters.

This invention provides cementiferous compositions comprising, as a plasticizer additive, an effective amount of an aqueous solution of a copolymer or a soluble salt thereof, the copolymer comprising:

i) about 33 to about 95 mole % of an ethylenically polymerizable carboxylic acid and ii) from about 67 to about 5 mole % of an alkyl (C1 to C8) ester of an ethylenically polymerizable carboxylic acid.

In accordance with an alternate embodiment of the invention, we have found that the copolymer may be further improved with respect to its use as a more cost effective plasticizer additive by the copolymerization therein of a third ethylenically unsaturated monomer. Examples of suitable monomers are vinyl esters such as vinyl acetate and vinyl propionate; maleate and fumarate ($C_1$ to $C_8$) esters and diesters; allyl alcohol; ethylene; aromatic vinyl compounds such as styrene; vinyl alcohol (obtained by hydrolyzing a vinyl acetate based polymer); and mixtures thereof. Surprisingly, the addition of this third monomer, while substantially lowering the cost of the polymer, has been found to have little or no deleterious effect upon the efficiency of the polymer as a plasticizer, even when added at levels as high as about 50% by weight of the copolymer. Thus, when the third monomer is present the polymer has the composition:

i) from about 45 to 90 mole % of the ethylenically polymerizable carboxylic acid, ii) from about 5 to about 50 mole % of the ester, and iii) from about 5 to about 50 mole % of the third comonomer.

The cementiferous composition will preferably contain from about 0.01% to about 2.5% by weight of the copolymer with respect to the cement component.

In accordance with a further aspect of this invention, there is provided a plasticizer additive composition comprising an aqueous solution of a copolymer or soluble salt thereof comprising from about 45 to 90 mole % of the ethylenically polymerizable carboxylic acid and from about 5 to about 50 mole % of the ester. The plasticizer additive may also contain 5 to 50 mole % of a third ethylenically comonomer as described above.

These plasticizer additives may contain anti-foaming agents or air entraining agents, accelerators and other components conventional in the art. These additives, if present, are employed in effective amounts, for example anti-foaming agents are generally used in the range of about 0.1 to 2% by weight of the copolymer or salt thereof. Suitable anti-foaming agents include tributylphosphates, dibutyl phthalate, various water-insoluble alcohols and silicone derivatives. Suitable accelerators include, for example, sodium thiocyanate and triethanolamine, used generally at levels of about 15 to 35% by weight of the copolymer.

The invention also includes a process for making a cementiferous composition wherein the plasticizer additive defined is added to the composition components during mixing.

DETAILED DESCRIPTION OF THE PREFERRED EMBODIMENTS

The ethylenically unsaturated carboxylic acids suitable for use herein include acrylic, maleic, methacrylic, crotonic, fumaric, itaconic, citraconic and/or aconitic acids and mixtures thereof. However the acids are not restricted to being mono or dicarboxylic. Acrylic, maleic and methacrylic acids are preferred. The preferred esters are the methyl, ethyl butyl and propyl derivatives. Preferred copolymers are those of acrylic acid with ethyl acrylate or methyl methylacrylate with the copolymer of acrylic acid and methyl methacrylate being most preferred.

As noted previously, in the broadest scope of the invention, the mole percentage of the acid in the copolymer is 33 to 95%, preferably 60 to 85% with the ester comprising the remainder of the polymer.

In the embodiment wherein a third ethylenically unsaturated comonomer is present, the acid is used in amount of 45 to 90 mole %, preferably 60 to 80%, the ester in an amount of 5 to 50 mole %, preferably 10 to 30, and the third comonomer in an amount of 5 to 50 mole %, preferably 10 to 30%.

Suitable polymers may be made by the copolymerization of the alkyl ester with the ethylenically unsaturated acid and, optionally the third monomer, using methods known in polymerization technology. The resultant copolymer or terpolymer may be neutralized with a suitable base such as sodium hydroxide or other soluble base to form a soluble salt and diluted with water to the required concentration for use in the cementiferous compositions and plasticizer additives provided by this invention. Representative salt cations are preferably alkali metal, e.g. sodium, potassium, alkaline earth metals e.g. calcium, magnesium, organic bases, e.g. amines and their derivatives, and ammonia.

Absolute molecular weights of the polymers of this invention have not been determined. However, apparent molecular weights as calculated relative to sodium polyacrylate standards have been determined using gel permeation chromatography. The apparent molecular weight of the copolymer may be varied over a wide range, the preferred range being 1000 to 15000, more preferably 1000 to 9000.

Precise molecular weights have not been determined for all the copolymers used but in some cases viscosity determinations have been carried out. The preferred viscosity is less than 30 cps as a 15% by weight aqueous solution in 1 molar NaCl as measured by a Brookfield viscometer model LVT with UV adaptor at 65 rpm and 25° C.

The water soluble copolymer or salt thereof is used as a plasticizer additive in cementiferous compositions in amount of 0.01 to 2.5% by weight, preferably 0.03 to 2.0%, of the cement.

EXAMPLES

Examples of sodium salts of the copolymers and terpolymers and their application in cementiferous compositions will now be given to illustrate but not limit the invention.

The cement mix used in the following examples had the composition:

| | |
|---|---|
| Portland cement | 350 Kg/m$^3$ |
| gravel (20 mm) | 780 Kg/m$^3$ |
| gravel (10 mm) | 330 Kg/m$^3$ |
| sand | 700 Kg/m$^3$ |
| water/cement ratio | 0.57 |

The aggregate (gravels and sand) was placed in a mixer with half the water and mixed for 30 seconds. After standing for one minute the mixer was restarted and the cement component added over 30 seconds. The remainder of the water was then added and mixing continued for a further two minutes. The plasticizer polymer admixture (if present) was then added at a level of 0.12% by weight, i.e. as 0.4% w/w of 30% w/w solution, of cement component and the whole mixed for a further one minute.

The cementitious compositions prepared were tested for slump, plastic density, compressive strength and setting time according to British Standard 1881. The flow properties were tested by the method of DIN 1048.

Twelve copolymers and terpolymers were prepared and tested as their sodium salts against a copolymer sodium salt disclosed in U.S. Pat. No. 4,473,406 (European patent specification 0097513) as standard. Appropriate measurements were also made on the two base cementiferous compositions not containing an admixture. The twelve examples and standard copolymer had the compositions set out in Table I.

The sodium salts of the polymers were prepared at 30% w/w solutions and 0.25% w/w tributyl phosphate added as anti-foamer. These admixtures were tested at a level of 0.4% w/w of cement using two cement bases indicated as Base 1 and Base 2 in Table II. This Table records the properties of the cementiferous compositions prepared. It will be seen that the copolymers of the invention substantially improve the properties of the cement bases and are as effective as the known more expensive hydroxy ester containing polymers.

TABLE I

| Component (mole %) | Admixture | | | | | | | | | | | | |
|---|---|---|---|---|---|---|---|---|---|---|---|---|---|
| | A | B | C* | E | F | G | H | J** | K** | L | N | P | R |
| Acrylic acid | 60 | 85 | 70 | 90 | 95 | — | 85 | 56 | 46 | 56 | 65 | 56 | 63 |
| Methyl methacrylate | 40 | 15 | — | 10 | 5 | 15 | — | 22 | 8 | 22 | 20 | 22 | 24 |
| Methacrylic acid | — | — | — | — | — | 85 | — | — | — | — | — | — | — |
| Ethyl acrylate | — | — | — | — | — | — | 15 | — | — | — | — | — | — |
| Vinyl alcohol | — | — | — | — | — | — | — | 22 | 46 | — | — | — | — |
| Vinyl acetate | — | — | — | — | — | — | — | — | — | 22 | 15 | — | — |
| Allyl alcohol | — | — | — | — | — | — | — | — | — | — | — | 22 | — |
| Styrene | — | — | — | — | — | — | — | — | — | — | — | — | 13 |
| Hydroxy propyl methacrylate | — | — | 30 | — | — | — | — | — | — | — | — | — | — |
| viscosity (cps) | 15.0 | 8.0 | 5.5 | 9.7 | 8.0 | 18.0 | 8.5 | 7.7 | 11.2 | 13.5 | 8.6 | 10.3 | NM |

*standard copolymer
**these polymers were prepared by hydrolysis of acrylic acid/vinyl acetate/methyl methacrylate terpolymers.
NM — not measured

TABLE II

| | Property | | | | | | | | | |
|---|---|---|---|---|---|---|---|---|---|---|
| | | | Flow | | Setting time (hrs) | | Time return to 50 mm slump (hrs) | Compressive strength (N/mm$^2$) | | |
| Admixture | Slump (mm) | Plastic Density | Before tamping | After tamping | 500 psi | 4000 psi | | 1 day | 7 days | 28 days |
| Base 1 | 55 | 2390 | 20 | Sheared | 4.3 | 5.8 | — | 11.9 | 34.0 | — |

TABLE II-continued

| Admixture | Slump (mm) | Plastic Density | Flow Before tamping | Flow After tamping | Setting time (hrs) 500 psi | Setting time (hrs) 4000 psi | Time return to 50 mm slump (hrs) | Compressive strength (N/mm²) 1 day | Compressive strength (N/mm²) 7 days | Compressive strength (N/mm²) 28 days |
|---|---|---|---|---|---|---|---|---|---|---|
| A | | 2410 | 36 | 64 | 7.0 | 8.7 | 3.75 | 9.4 | 33.0 | — |
| B | | 2400 | 35 | 63 | 7.4 | 9.4 | 3.50 | 9.5 | 36.5 | — |
| C* | | 2410 | 36 | 64 | 7.2 | 9.4 | 3.75 | 9.5 | 35.5 | — |
| J | | 2405 | 32 | 62 | 6.7 | 8.5 | 1.40 | 11.5 | 36.0 | — |
| K | | 2400 | 32 | 61 | 7.0 | 8.7 | 1.10 | 12.3 | 35.0 | — |
| L | | 2400 | 34 | 63 | 7.7 | 9.0 | 3.60 | 11.0 | 36.0 | — |
| Base 2 | 50 | 2400 | 20 | Sheared | — | — | — | 16.1 | — | 47.0 |
| C* | | 2410 | 36 | 62 | — | — | — | 16.1 | — | 48.0 |
| E | | 2420 | 32 | 61 | — | — | — | 14.4 | — | 46.8 |
| F | | 2420 | 33 | 60 | — | — | — | 14.1 | — | 45.6 |
| G | | 2415 | 35 | 61 | — | — | — | 15.8 | — | 47.5 |
| H | | 2405 | 29 | 58 | — | — | — | 14.6 | — | 47.5 |
| N | | 2400 | 37 | 64 | — | — | — | 15.1 | — | 49.5 |
| P | | 2410 | 30 | 56 | — | — | — | 15.6 | — | 47.0 |
| R | | 2400 | 31 | 58 | — | — | — | 12.3 | — | 42.5 |

Dash indicates measurement was not taken.
Sheared indicates the cement did not flow properly so an accurate measurement could not be made.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A cementiferous additive composition comprising as the sole plasticizing additive, 0.01 to 2.5% by weight (solids) of a water soluble copolymer or soluble salt thereof having a molecular weight of 1,000 to 15,000 consisting essentially of:
   i) about 33 to 95 mole % of an ethylenically polymerizable carboxylic acid and
   ii) from 67 to 5 mole % of an alkyl ($C_1$ to $C_8$) ester of an ethylenically polymerizable carboxylic acid.

2. Compositions according to claim 1 wherein the salt cations are selected from the group consisting of alkali metal, alkaline earth metals, organic bases, and ammonia.

3. Compositions according to claim 2 wherein the salt cations are selected from the group consisting of sodium, potassium, calcium and magnesium.

4. Compositions according to claim 1 wherein the ethylenically unsaturated carboxylic acid is selected from the group consisting of acrylic, maleic, methacrylic, crotonic, fumaric, itaconic, citraconic and aconitic acids and mixtures thereof.

5. Compositions according to claim 1 wherein the alkyl ester is selected from the group consisting of methyl, ethyl, propyl and butyl derivatives.

6. Compositions according to claim 1 wherein the copolymers are those of acrylic acid with ethyl acrylate or acrylic acid with methyl methacrylate.

7. A cementiferous additive composition comprising, as a plasticizer additive, a water soluble polymer or soluble salt thereof having a molecular weight of 1,000 to 15,000 consisting essentially of:
   i) from 45 to 90 mole % of an ethylenically unsaturated carboxylic acid;
   ii) from 5 to 50 mole % of an alkyl ($C_1$ to $C_8$) ester of an ethylenically unsaturated carboxylic acid; and
   iii) from 5 to 50 mole % of a third ethylenically unsaturated comonomer selected from the group consisting of vinyl acetate; vinyl propionate; maleate and fumerate ($C_1$ to $C_8$ esters and diesters; allyl alcohol; ethylene; styrene, vinyl alcohol and mixtures thereof.

8. Compositions of claim 7 wherein the third monomer is selected from the group consisting of vinyl acetate, allyl alcohol, vinyl alcohol, styrene and mixtures thereof.

9. A process for the preparation of a plasticized cementiferous composition comprising adding to a cementiferous material, as a plasticizer additive, 0.01 to 2.5% by weight (solids) of an aqueous solution of a copolymer, or soluble salt thereof, having a molecular weight of 1,000 to 15,000 consisting essentially of:
   i) about 33 to 95 mole % of an ethylenically polymerizable carboxylic acid and
   ii) from 67 to 5 mole % of an alkyl ($C_1$ to $C_8$) ester of an ethylenically polymerizable carboxylic acid.

10. A process for the preparation of a plasticized cementiferous composition comprising adding to a cementiferous material, as a plasticizer additive, 0.01 to 2.5% by weight (solids) of an aqueous solution of a polymer, or soluble salt thereof consisting essentially of:
    i) from 45 to 90 mole % of an ethylenically unsaturated carboxylic acid;
    ii) from 5 to 50 mole % of an alkyl ($C_1$ to $C_8$ ester of an ethylenically unsaturated carboxylic acid; and
    iii) from 5 to 50 mole % of a third ethylenically unsaturated comonomer selected from the group consisting of vinyl acetate; vinyl propionate; maleate and fumerate ($C_1$ to $C_8$ esters and diesters; allyl alcohol; ethylene; styrene, vinyl alcohol and mixtures thereof.

11. Cementiferous compositions comprising, as a plasticizer additive, a water soluble polymer or soluble salt thereof having a molecular weight of 1,000 to 15,000, said additive consisting essentially of:
    i) about 33 to 95 mole % of an ethylenically polymerizable carboxylic acid;
    ii) from 67 to 5 mole % of an alkyl ($C_1$ to $C_8$) ester of an ethylenically polymerizable carboxylic acid; and
    iii) up to 50 mole % of a third ethylenically unsaturated comonomer selected from the group consisting of vinyl acetate; vinyl propionate; maleate and fumerate ($C_1$ to $C_8$) esters and diesters; allyl alcohol; ethylene; styrene; vinyl alcohol and mixtures thereof.

* * * * *